United States Patent
Ashok et al.

(10) Patent No.: US 8,984,134 B2
(45) Date of Patent: Mar. 17, 2015

(54) UNIFIED CLOUD COMPUTING INFRASTRUCTURE TO MANAGE AND DEPLOY PHYSICAL AND VIRTUAL ENVIRONMENTS

(75) Inventors: Rohith K. Ashok, Apex, NC (US); Thomas M. Brey, Cary, NC (US); Raymond J. Harrington, Staatsburg, NY (US); Matt R. Hogstrom, Cary, NC (US); Matthew J. Sheard, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/465,504

(22) Filed: May 7, 2012

(65) Prior Publication Data

US 2013/0297772 A1    Nov. 7, 2013

(51) Int. Cl.
*G06F 15/173* (2006.01)
*G06F 3/00* (2006.01)
(Continued)

(52) U.S. Cl.
CPC ............... *G06F 9/5072* (2013.01); *H04L 67/10* (2013.01)
USPC ........... 709/226; 709/223; 709/224; 709/201; 715/733; 715/705

(58) Field of Classification Search
CPC . H04L 67/10; H04L 41/0803; H04L 41/5054; G06F 11/30; G06F 9/5072; G06F 15/161; G06F 9/5077; G06F 9/5088
USPC ................... 715/705; 710/104, 302; 717/169; 709/223–226, 235
See application file for complete search history.

(56) References Cited

U.S. PATENT DOCUMENTS 7,715,207 B2    5/2010  Behrens et al.
2003/0105904 A1*  6/2003  Abbondanzio et al. ....... 710/302
(Continued)

FOREIGN PATENT DOCUMENTS

WO    2010141641    12/2010

OTHER PUBLICATIONS

"Infrastructure Management of Hybrid Cloud for Enterprise Users" by Shixing Yan, Bu Sung Lee, Guopeng Zhao, Ding Ma, Peer Mohamed, in IEEE 2011.*

(Continued)

*Primary Examiner* — Wing F Chan
*Assistant Examiner* — Raji Krishnan
(74) *Attorney, Agent, or Firm* — Robert A. Voigt, Jr.; Winstead, P.C.

(57) ABSTRACT

A method, system and computer program product for managing and deploying physical and virtual environments across multiple hardware platforms. A single unit, referred to herein as a cloud construction block, contains both the hardware and software components used to build a cloud computing environment. By having such a single unit contain both the hardware and software components needed to build a cloud computing environment, the user no longer needs to purchase and integrate different hardware and software components. Furthermore, the cloud construction block contains modular pieces of hardware, such as compute hardware, memory hardware, storage hardware and network hardware, that are integrated with management software configured to manage both the hardware and the cloud computing environment in a seamlessly integrated package. Since there is a single management system, the management software allows the user to manage the modular pieces of hardware via a single user interface.

18 Claims, 8 Drawing Sheets

(51) Int. Cl.
*G06F 9/50* (2006.01)
*H04L 29/08* (2006.01)

(56) References Cited

U.S. PATENT DOCUMENTS

| | | | |
|---|---|---|---|
| 2008/0313539 A1* | 12/2008 | McClelland et al. | 715/705 |
| 2009/0300210 A1* | 12/2009 | Ferris | 709/235 |
| 2011/0302569 A1* | 12/2011 | Kunze et al. | 717/169 |
| 2012/0005344 A1* | 1/2012 | Kolin et al. | 709/226 |
| 2012/0022910 A1* | 1/2012 | Chi et al. | 705/7.22 |
| 2012/0117229 A1* | 5/2012 | Van Biljon et al. | 709/224 |
| 2012/0311012 A1* | 12/2012 | Mazhar et al. | 709/201 |
| 2012/0331119 A1 | 12/2012 | Bose et al. | |
| 2013/0198384 A1* | 8/2013 | Kirsch et al. | 709/226 |

OTHER PUBLICATIONS

Office Action for U.S. Appl. No. 13/466,224 dated May 7, 2014, pp. 1-20.
Yan et al., "Infrastructure Management of Hybrid Cloud for Enterprise Users," 2011 5th International DMTF Academic Alliance, Oct. 24, 2011, pp. 1-6.
Mell et al., "The NIST Definition of Cloud Computing," Special Publication 800-145, Sep. 2011.
Office Action for U.S. Appl. No. 13/466,224 dated Oct. 22, 2014, pp. 1-20.

* cited by examiner

UNIFIED CLOUD COMPUTING INFRASTRUCTURE TO MANAGE AND DEPLOY PHYSICAL AND VIRTUAL ENVIRONMENTS

TECHNICAL FIELD

The present invention relates to cloud computing, and more particularly to developing a unified cloud computing infrastructure to manage and deploy physical and virtual environments across multiple hardware platforms.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

Currently, if a user desires to build a cloud computing environment, the user has to purchase different hardware and software components which are then integrated amongst each other. For example, in an x86 environment, the user purchases individual physical machines, where each physical machine would either have internal storage or require the user to purchase and configure external storage. Furthermore, switches would have to be purchased to connect the network devices in the cloud computing environment and separately configured in order to network them together.

Such a process in building a cloud computing environment is inefficient and time consuming.

BRIEF SUMMARY

In one embodiment of the present invention, a cloud computing system comprises a cloud construction block. The cloud construction block comprises modular pieces of hardware comprising compute hardware, memory hardware, storage hardware and network hardware. The cloud construction block further comprises a management blade coupled to the modular pieces of hardware within the cloud construction block. The management blade comprises a memory unit for storing a computer program for managing the modular pieces of hardware and managing a user's workload. Furthermore, the management blade comprises a processor coupled to the memory unit, where the processor, responsive to the computer program, comprises circuitry for presenting a user interface to manage the modular pieces of hardware of the cloud construction block.

Other forms of the embodiment of the system described above are in a computer program product and in a method.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
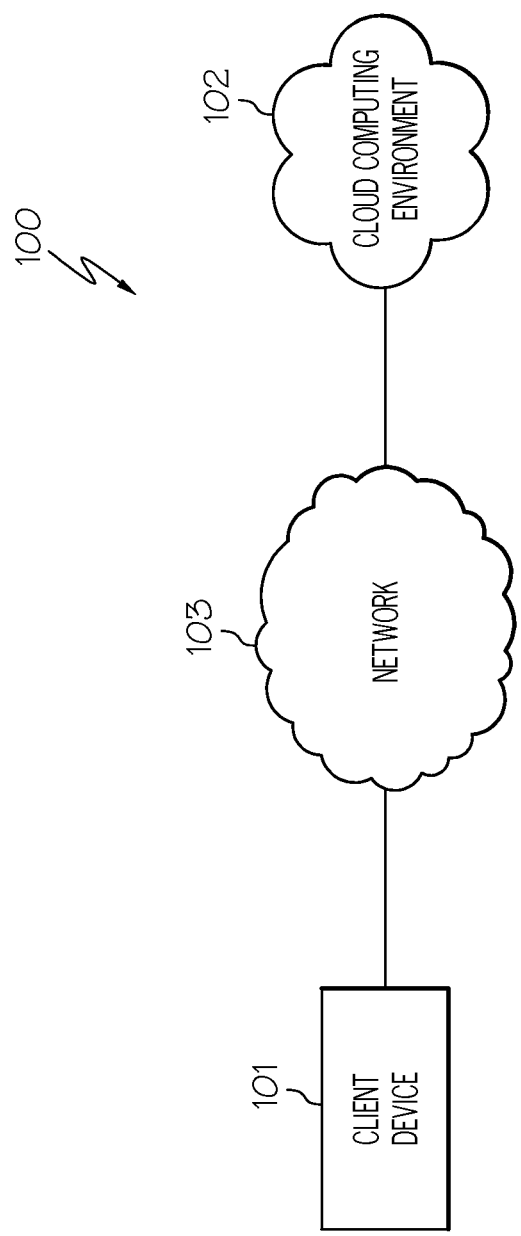
FIG. 1 illustrates a network system configured in accordance with an embodiment of the present invention.

The present invention comprises a method, system and computer program product for managing and deploying physical and virtual environments across multiple hardware platforms. In one embodiment of the present invention, a single unit, referred to herein as a cloud construction block, contains both the hardware and software components used to build a cloud computing environment. By having such a single unit contain both the hardware and software components needed to build a cloud computing environment, the user no longer needs to purchase and integrate different hardware and software components. Furthermore, the cloud construction block contains modular pieces of hardware, such as compute hardware, memory hardware, storage hardware and network hardware, that are integrated with management software configured to manage both the hardware and the cloud computing environment in a seamlessly integrated package. Since there is a single management system, the management software allows the user to manage the modular pieces of hardware via a single user interface.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
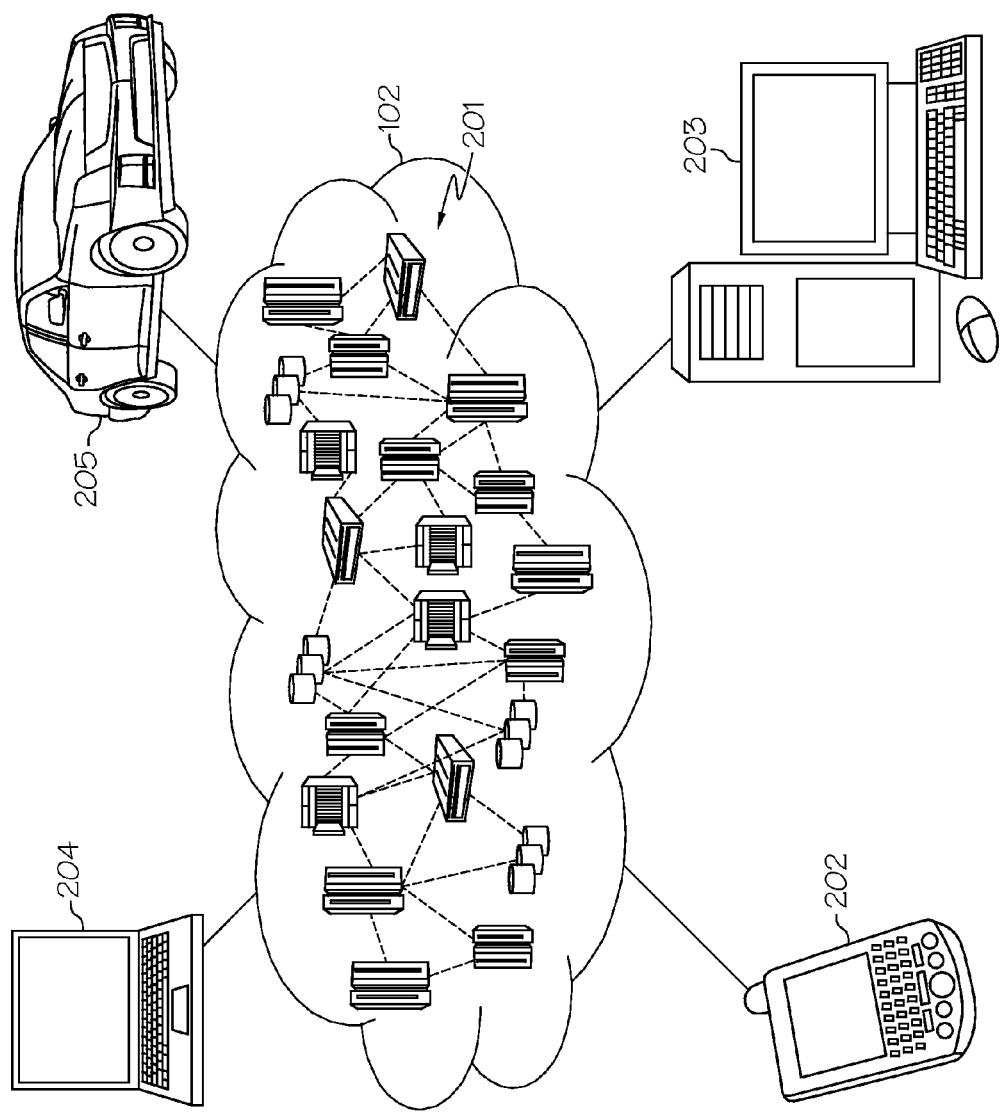
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3.

It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a management blade in computing nodes 201 may store program code on a computer readable storage medium on the management blade. The management blade may download the program code to computing device 202, 203, 204, 205 for use on the computing device.

Figure 3:
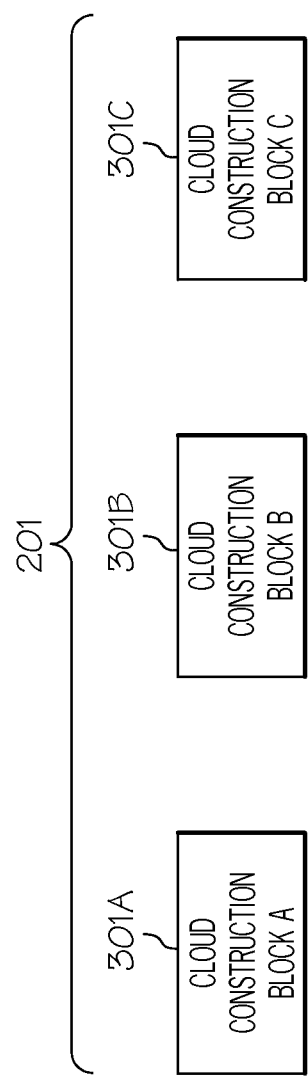
FIG. 3 is a schematic of a cloud computing node of the cloud computing environment that includes cloud construction block(s) in accordance with an embodiment of the present invention.

Referring now to FIG. 3, FIG. 3 illustrates a schematic of a cloud computing node 201 comprised of one or more "cloud construction blocks" 301A-301C (labeled "Cloud Construction Block A," "Cloud Construction Block B," and "Cloud Construction Block C," respectively, in FIG. 3) in accordance with an embodiment of the present invention. Cloud construction blocks 301A-301C may collectively or individually be referred to as cloud construction blocks 301 or cloud construction block 301, respectively. Each cloud construction block 301 may be represented by a single unit that includes both a hardware and software environment as illustrated in FIG. 4.

Figure 4:
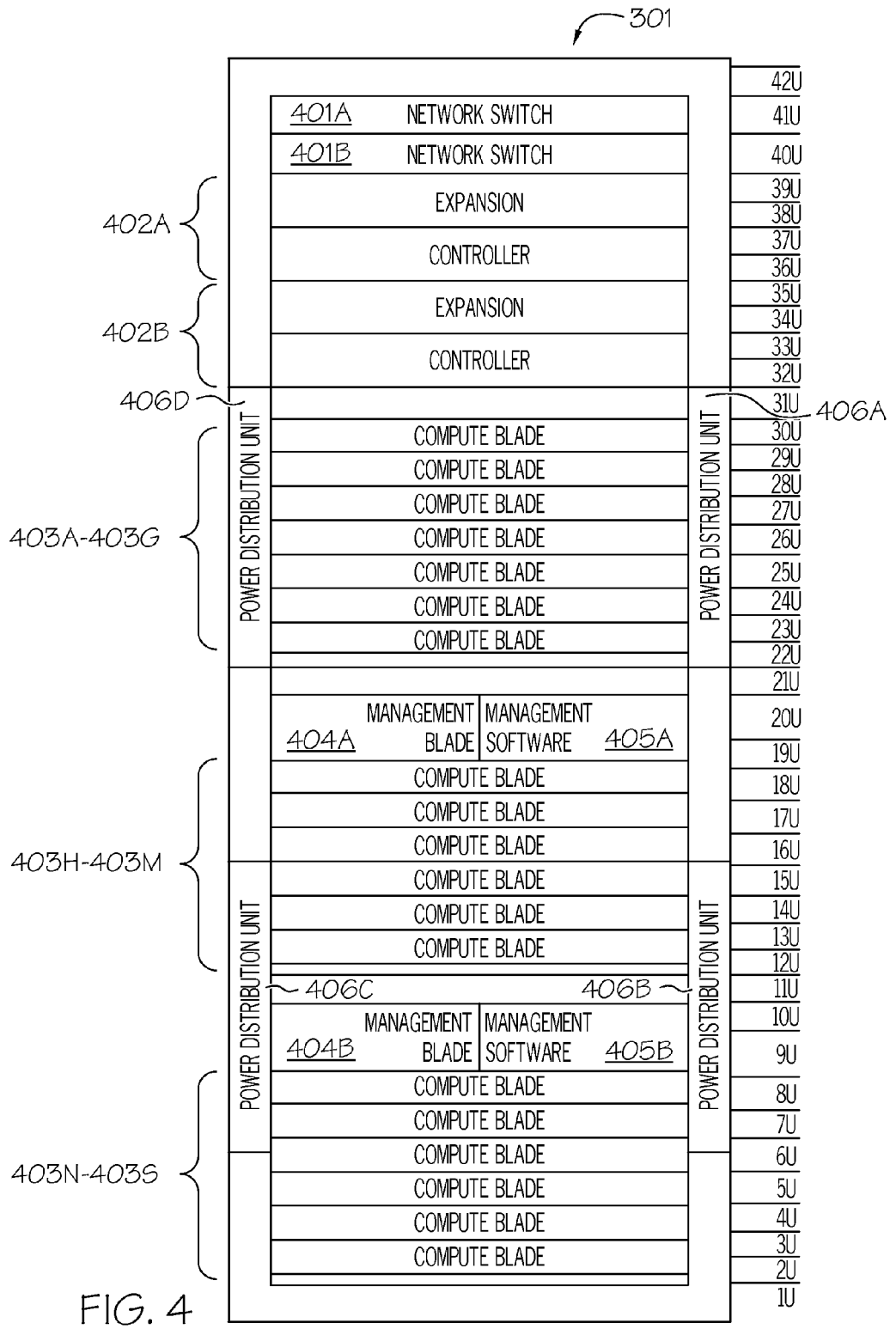
FIG. 4 illustrates a physical layout of a cloud construction block in accordance with an embodiment of the present invention.

FIG. 4 illustrates a physical layout of a cloud construction block 301 in accordance with an embodiment of the present invention. Referring to FIG. 4, cloud construction block 301 may comprise a rack of many units (FIG. 4 illustrates 42 rack units) containing network hardware (e.g., network switches 401A, 401B), storage hardware (e.g., disk arrays 402A, 402B), and compute hardware (e.g., compute blades 403A-403S). Network switches 401-401B may collectively or individually be referred to as network switches 401 or network switch 401, respectively. Disk arrays 402A-402B may collectively or individually be referred to as disk arrays 402 or disk array 402. Compute blades 403A-403S may collectively or individually be referred to as compute blades 403 or compute blade 403, respectively.

Cloud construction block 301 may further include one or more management blades 404A-404B with memory configured to store software referred to herein as "management software" 405A-405B, respectively. Management blades 404A-404B may collectively or individually be referred to as management blades 404 or management blade 404, respectively. A description of the hardware configuration of management blade 404 is provided further below in connection with FIG. 5. Management software 405A-405B may collectively or individually be referred to as management software 405. Management software 405 is configured to manage and automate all aspects of the cloud computing system (comprised of one or more cloud construction blocks 301) both physical and virtual as discussed further herein in connection with FIGS. 6-10. Additionally, cloud construction block 301 may include one or more power distribution units 406A-406D. Power distribution units 406A-406D may collectively or individually be referred to as power distribution units 406 or power distribution unit 406, respectively.

While FIG. 4 illustrates cloud construction block 301 as comprising 42 units containing a particular number of network switches 401, disk arrays 402, compute blades 403, management blades 404, management software 405 and power distribution units 406, cloud construction block 301 is not to be limited in scope to the particular number of components depicted in FIG. 1. Cloud construction block 301 may include any number of components used to support the network hardware, storage hardware, compute hardware and memory hardware (e.g., memory of management blade 404) and may include any number of management blades 404 to manage the operation of one or more cloud construction blocks 301 to form the cloud computing environment.

By having a single unit, such as a cloud construction block 301, contain both the hardware and software components to build a cloud computing environment, a user no longer needs to purchase and integrate different hardware and software components. Instead, such a unit contains modular pieces of hardware, such as compute hardware, memory hardware (e.g., memory of management blade 404), storage hardware and network hardware, that are integrated with management software 405 to manage both the hardware and the cloud computing environment in a seamlessly integrated package. Since there is a single management system, management software 405 allows the user to handle the monitoring, hardware lifecycle, firmware updates, etc. via a single user interface as discussed in further detail below in connection with FIGS. 6-10.

Figure 5:
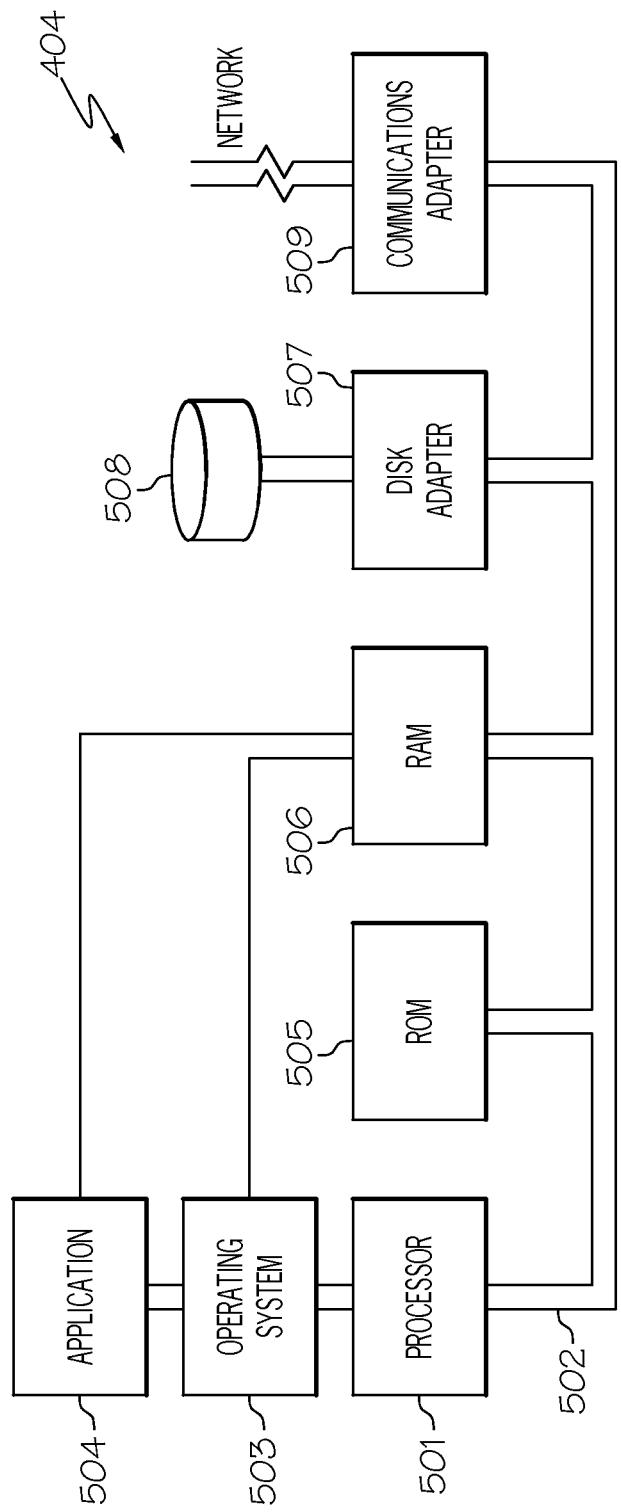
FIG. 5 illustrates a hardware configuration of a management blade configured in accordance with an embodiment of the present invention.

Referring now to FIG. 5, FIG. 5 illustrates a hardware configuration of management blade 404 (FIG. 4) which is representative of a hardware environment for practicing the present invention. Management blade 404 has a processor 501 coupled to various other components by system bus 502. An operating system 503 runs on processor 501 and provides control and coordinates the functions of the various components of FIG. 5. An application 504 in accordance with the principles of the present invention runs in conjunction with operating system 503 and provides calls to operating system 503 where the calls implement the various functions or services to be performed by application 504. Application 504 may include, for example, management software 405 (FIG. 4) configured to manage the modular pieces of hardware of one or more cloud construction blocks 301 (FIGS. 3 and 4) as well as manage a user's workload as discussed further below in association with FIGS. 6-10.

Referring again to FIG. 5, read-only memory ("ROM") 505 is coupled to system bus 502 and includes a basic input/output system ("BIOS") that controls certain basic functions of management blade 404. Random access memory ("RAM") 506 and disk adapter 507 are also coupled to system bus 502. It should be noted that software components including operating system 503 and application 504 may be loaded into RAM 506, which may be management blade's 404 main memory for execution. Disk adapter 507 may be an integrated drive electronics ("IDE") adapter that communicates with a disk unit 508, e.g., disk drive. It is noted that management software 405 configured to manage the modular pieces of hardware of one or more cloud construction blocks 301 as well as manage a user's workload, as discussed further below in association with FIGS. 6-10, may reside in disk unit 508 or in application 504.

Management blade 404 may further include a communications adapter 509 coupled to bus 502. Communications adapter 509 interconnects bus 502 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, if a user desires to build a cloud computing environment, the user has to purchase different hardware and software components which are then integrated amongst each other. For example, in an x86 environment, the user purchases individual physical machines, where each physical machine would either have internal storage or require the user to purchase and configure external storage. Furthermore, switches would have to be purchased to connect the network devices in the cloud computing environment and separately configured in order to network them together. Such a process in building a cloud computing environment is inefficient and time consuming.

Figure 6:
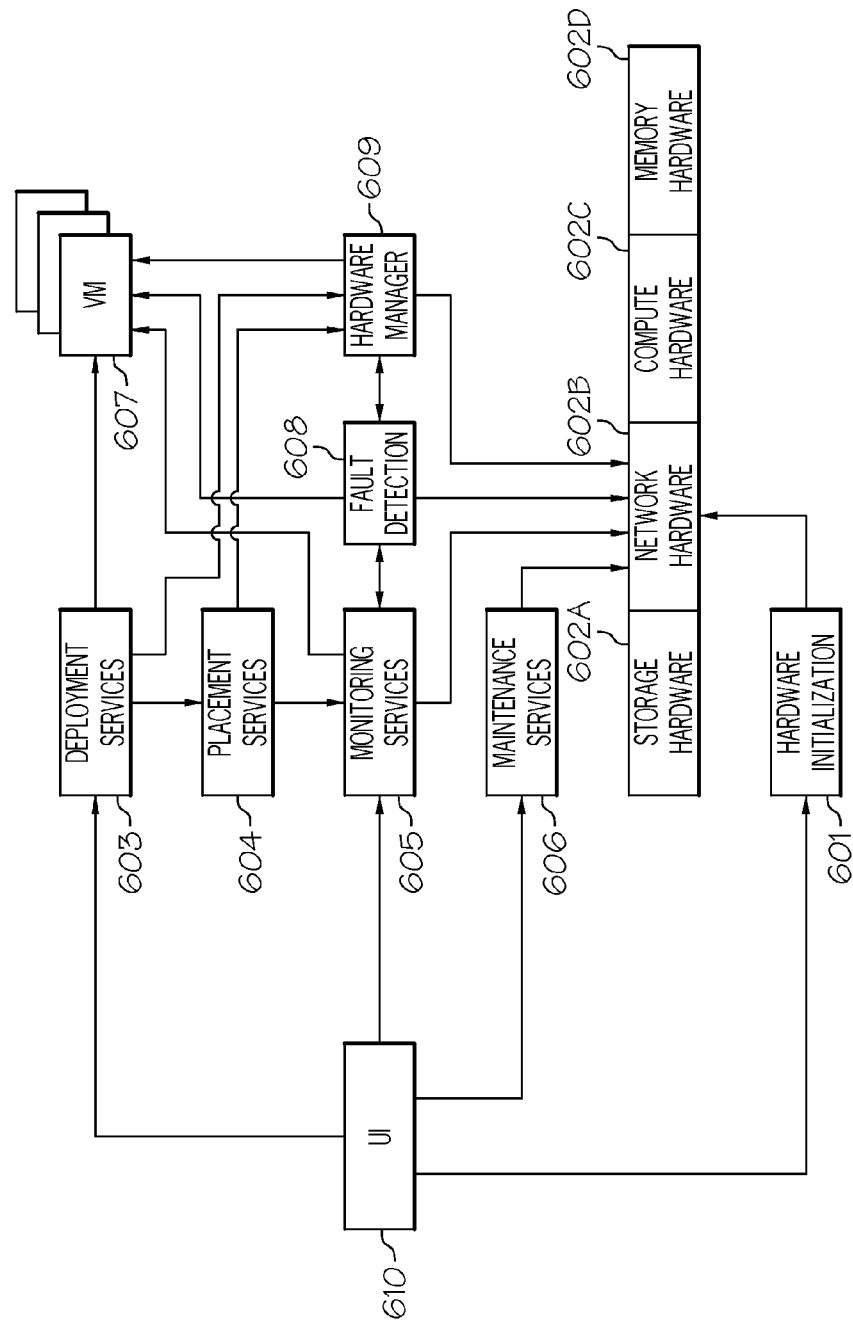
FIG. 6 is a diagram of the software components of the management software used to manage the cloud computing system through the use of a user interface in accordance with an embodiment of the present invention.
Figure 7:
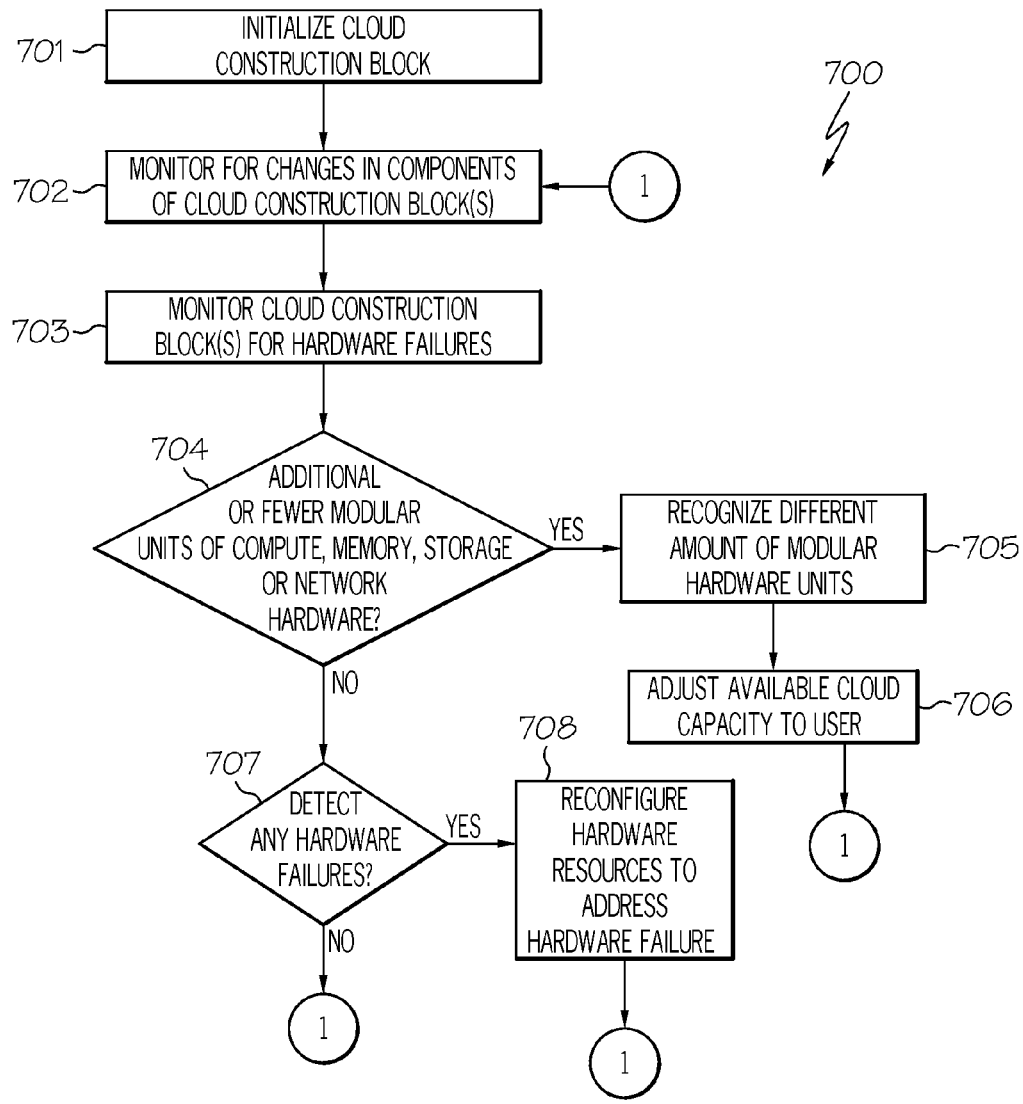
FIG. 7 is a flowchart of a method for monitoring the cloud computing system in accordance with an embodiment of the present invention.
Figure 8:
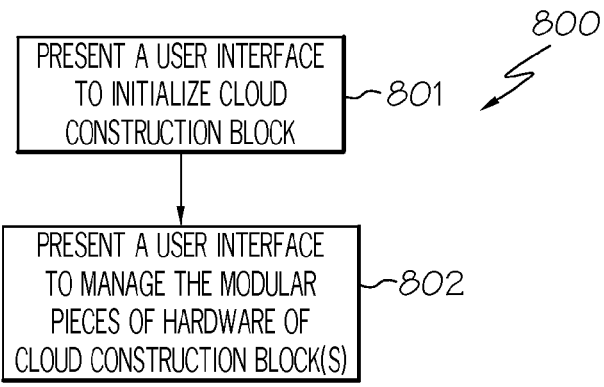
FIG. 8 is a flowchart of a method for handling the management of the cloud computing system in accordance with an embodiment of the present invention.
Figure 9:
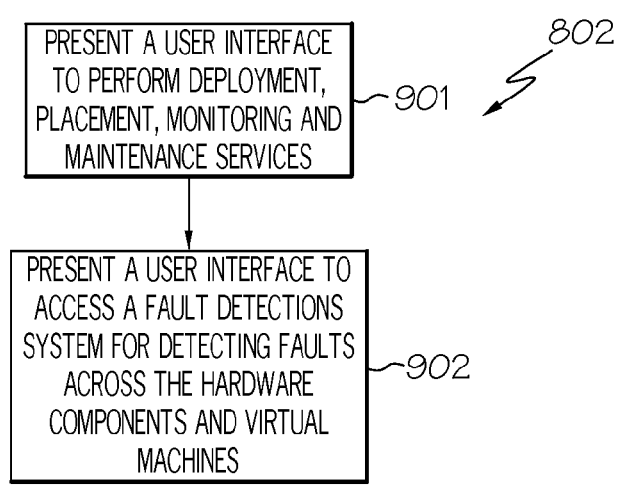
FIG. 9 is a flowchart of the sub-steps of presenting a user interface to manage the modular pieces of hardware of the cloud computing system in accordance with an embodiment of the present invention.
Figure 10:
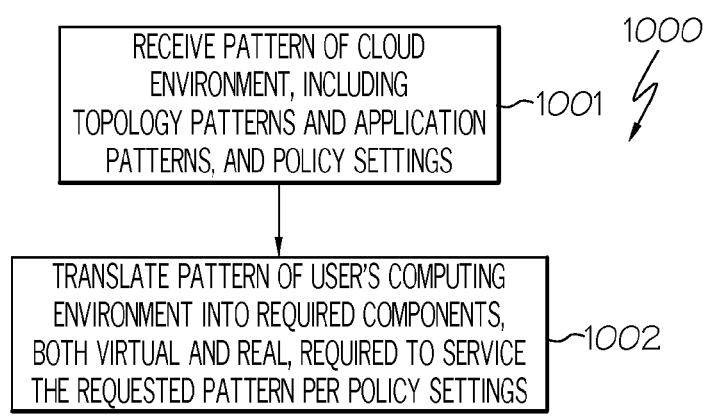
FIG. 10 is a flowchart of a method for creating and managing the cloud computing system based on the user's patterns of their computing environment and policy settings in accordance with an embodiment of the present invention.

The principles of the present invention provide an efficient and simplified manner in building a cloud computing environment through the use of a single unit, referred to herein as a cloud construction block 301 (FIGS. 3 and 4), that contains both the hardware and software components to build the cloud computing environment. Cloud construction block 301 includes management software 405 (FIG. 4) used to manage and automate all aspects of the cloud computing system both physical and virtual, such as hardware maintenance and management, as discussed further below in connection with FIGS. 6-10. FIG. 6 is a diagram of the software components of management software 405 used to manage the cloud computing system through the use of a user interface. FIG. 7 is a flowchart of a method for monitoring the cloud computing system. FIG. 8 is a flowchart of a method for handling the management of the cloud computing system through the use of a single user interface. FIG. 9 is a flowchart of the sub-steps of presenting a user interface to manage the modular pieces of hardware of the cloud computing system. FIG. 10 is a flowchart of a method for creating and managing the cloud computing system based on the user's patterns of their computing environment and policy settings.

Referring now to FIG. 6, FIG. 6 illustrates the software components of management software 405 (FIG. 4) used in managing the cloud computing system (comprised of one or more cloud construction blocks 301) through the use of a user interface in accordance with an embodiment of the present invention. In one embodiment, these software components are the components or modules of management software 405.

As illustrated in FIG. 6, in conjunction with FIGS. 3-4, the software components of management software 405 include hardware initialization 601 configured to initialize the modular pieces of hardware (storage hardware 602A, network hardware 602B, compute hardware 602C and memory hardware 602D). These modular pieces of hardware were discussed in conjunction with cloud construction block 301 and will not be discussed in further detail for the sake of brevity.

The software components of management software 405 further includes deployment services 603, placement services 604, monitoring services 605 and maintenance services 606. Deployment services 603 may involve deploying physical and/or virtual machines 607 (identified as "VM" in FIG. 6). Such services may be based on the user's patterns of their computing environment as discussed further below.

Placement services 604 involve the appropriate placement of the hardware components of cloud construction block(s) 301. Placement services 604 may also involve upgrading firmware or software components of cloud construction block(s) 301. Monitoring services 605 involve monitoring hardware usage, bandwidth utilization, temperature and virtual machines utilization. A further discussion of the monitoring services is provided below in connection with FIG. 7. Maintenance services 606 involve performing routine actions on the hardware components, such as hardware components 602A-602D, to ensure they are in working order.

Additionally, management software 405 includes a fault detection component 608 configured to detect faults across the hardware components, such as hardware components 602A-602D, and virtual machines 607 of cloud construction block(s) 301. A further discussion of detecting hardware failures is provided below in connection with FIG. 7.

In addition, management software 405 includes a hardware manager 609 configured to manage the hardware components, such as hardware components 602A-602D, and virtual machines 607 of cloud construction block(s) 301 using various inputs from deployment services 603, placement services 604 and fault detection component 608.

A single user interface 610 may be presented to the user to perform or access these services as discussed further below in connection with FIGS. 8-10.

As stated above, FIG. 7 is a flowchart of a method 700 for monitoring the cloud computing system comprised of one or more cloud construction blocks 301 in accordance with an embodiment of the present invention.

Referring to FIG. 7, in conjunction with FIGS. 3-6, in step 701, management software 405 initializes cloud construction block 301.

In step 702, management software 405 monitors for changes in the components of cloud construction block(s) 301. For example, the user can add modular units of processing, memory, storage and/or network capability to cloud construction block 301 to add capacity to cloud construction block 301. Similarly, a user may reduce the number of modular units of processing, memory, storage and/or network capability to cloud construction block 301 to reduce capacity to cloud construction block 301. In another example, cloud construction blocks 301 may be added together to create a larger capacity cloud computing system. The difference in capacity (e.g., new capacity) may be recognized and made available by management software 405 to maintain a single overall cloud computing system.

In step 703, management software 405 monitors cloud construction block(s) 301 for hardware failures.

In step 704, a determination is made by management software 405 as to whether there are additional or fewer modular units of storage, network, compute and/or memory hardware 602-602D in cloud construction block(s) 301 from the last determination time.

If there are additional or fewer modular units of storage, network, compute and/or memory hardware 602-602D in cloud construction block(s) 301 from the last determination time, then, in step 705, management software 405 recognizes the different amount of modular hardware units in cloud construction block(s) 301. In step 706, management software 405 accordingly adjusts the cloud capacity available to the user. For example, if there are fewer modular units of storage and compute hardware, then management software 405 reduces the cloud capacity available to the user. Adjusting the cloud capacity may include rebalancing the cloud capacity resources (e.g., virtual machines 607) to effectively service the user's needs. Rebalancing may involve relocating virtual machine(s) 607 to other cloud construction block(s) 301, adding virtual machine(s) 607 to cloud construction block(s) 301, relocating virtual machine(s) 607 within the same cloud construction block 301 and any combination thereof.

Upon adjusting the available cloud capacity to the user, management software 405 continues to monitor for changes in the components of cloud construction block(s) 301 in step 702.

If, however, there are no additional or fewer modular units of storage, network, compute and/or memory hardware 602-602D in cloud construction block(s) 301 from the last determination time, then, in step 707, a determination is made by management software 405 as to whether any hardware failures are detected.

If hardware failures are detected, then, in step 708, management software 405 reconfigures the hardware resources to address the hardware failure.

Upon addressing the hardware failure, or if there were no hardware failures detected, management software 405 continues to monitor for changes in the components of cloud construction block(s) 301 in step 702.

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

As discussed above, the user may be presented with a single user interface 610 (FIG. 6) to perform or access various services as discussed further below in connection with FIGS. 8-10.

FIG. 8 is a flowchart of a method 800 for handling the management of the cloud computing system (comprised of one or more cloud construction blocks 301 of FIGS. 3 and 4) through the use of a single user interface 610 (FIG. 6) in accordance with an embodiment of the present invention.

Referring to FIG. 8, in conjunction with FIGS. 3-6, in step 801, management software 405 presents user interface 610 to the user for initializing cloud construction block 301 via hardware initialization component 601.

In step 802, management software 405 presents user interface 610 to the user for managing the modular pieces of hardware (e.g., storage hardware 602A, network hardware 602B, compute hardware 602C and memory hardware 602D) of cloud construction block(s) 301. Management of the modular pieces of hardware may involve many aspects, such as deployment, placement, monitoring, maintenance, detecting faults, etc. as discussed below in connection with FIG. 9.

FIG. 9 is a flowchart of the sub-steps of presenting a user interface to manage the modular pieces of hardware of the cloud computing system in accordance with an embodiment of the present invention.

Referring to FIG. 9, in conjunction with FIGS. 3-6 and 8, management software 405 presents user interface 610 to the user to perform deployment, placement, monitoring and maintenance services 603-606 for construction block(s) 301. Description of such services were provided above and will not be reiterated for the sake of brevity.

In step 902, management software 405 presents user interface 610 to the user to access a fault detection system 608 for detecting faults across the hardware components, such as hardware components 602A-602D, and virtual machines 607 of cloud construction block(s) 301.

In some implementations, method 800 may include other and/or additional steps that, for clarity, are not depicted. Further, in some implementations, method 800 may be executed in a different order presented and that the order presented in the discussion of FIGS. 8 and 9 is illustrative. Additionally, in some implementations, certain steps in method 800 may be executed in a substantially simultaneous manner or may be omitted.

As discussed above, since there is a single management system, management software 405 allows the user to handle the monitoring, hardware lifecycle, firmware updates, etc. via a single user interface 610. Management software 405 allows the user to describe patterns of their computing environment, including topology patterns and application patterns, as well as policy settings as discussed below in connection with FIG. 10.

FIG. 10 is a flowchart of a method 1000 for creating and managing the cloud computing system based on the user's patterns of their computing environment and policy settings in accordance with an embodiment of the present invention.

Referring to FIG. 10, in conjunction with FIGS. 3-6, in step 1001, management software 405 receives a pattern of a computing environment and policy settings from the user. In one embodiment, the patterns include topology patterns in the form of virtual machines or native operating system images. In one embodiment, the patterns include application patterns in the form of any application type (e.g., enterprise archive files).

In step 1002, management software 405 translates the pattern of the user's computing environment into the required components, both virtual and real, required to service the requested pattern per the policy settings.

In this manner, the creation and management of the cloud computing system is abstracted away from the user who only needs to focus on the pattern itself. With the pre-built cloud construction block 301, the user may simply focus on the applications/workloads and view cloud construction blocks 301 as simply the cloud capacity.

In some implementations, method 1000 may include other and/or additional steps that, for clarity, are not depicted. Further, in some implementations, method 1000 may be executed in a different order presented and that the order presented in the discussion of FIG. 10 is illustrative. Additionally, in some implementations, certain steps in method 1000 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A cloud computing system, comprising:
one or more cloud construction blocks, each cloud construction block comprising:
modular pieces of hardware comprising: compute hardware, memory hardware, storage hardware and network hardware; and
a management blade coupled to said modular pieces of hardware within the one or more cloud construction blocks, wherein said management blade comprises:
a memory unit for storing a computer program for managing said modular pieces of hardware and managing a user's workload; and
a processor coupled to said memory unit, wherein said processor is configured to execute the computer program comprising instructions for:
presenting a user interface to manage said modular pieces of hardware of the one or more cloud construction blocks, wherein said modular pieces of hardware of the one or more cloud construction blocks are used to build a cloud computing environment by deploying physical and virtual machines in the one or more cloud construction blocks;
recognizing additional or fewer modular units of one or more of said compute hardware, said memory hardware, said storage hardware and said network hardware in the one or more cloud construction blocks from a last determination time; and
adjusting cloud capacity available to a user based on said recognizing of additional or fewer modular units of one or more of said compute hardware, said memory hardware, said storage hardware and said network hardware in the one or more cloud construction blocks, wherein said adjusting said cloud capacity available to said user comprises rebalancing cloud capacity resources to service said user, wherein said rebalancing comprises relocating one or more virtual machines from one cloud construction block to another cloud construction block, adding one or more virtual machines to a cloud construction block, relocating one or more virtual machines within a cloud construction block and any combination thereof.

2. The cloud computing system as recited in claim 1, wherein the computer program further comprises instructions for:
initializing the one or more cloud construction blocks;
monitoring for changes in components of the one or more cloud construction blocks; and monitoring hardware failures of said modular pieces of hardware.

3. The cloud computing system as recited in claim 1, wherein the computer program further comprises instructions for:
receiving a pattern of a computing environment and policy settings; and
translating said pattern into required components to service said pattern per said policy settings.

4. The cloud computing system as recited in claim 3, wherein the computer program further comprises instructions for:
receiving a topology pattern in a form of virtual machines.

5. The cloud computing system as recited in claim 3, wherein the computer program further comprises instructions for:
receiving an application pattern.

6. The cloud computing system as recited in claim 1, wherein the computer program further comprises instructions for:
presenting said user interface to perform one or more of deployment, placement, monitoring and maintenance services for the one or more cloud construction blocks.

7. The cloud computing system as recited in claim 1, wherein the computer program further comprises instructions for:
presenting said user interface to perform deployment services for the one or more cloud construction blocks, wherein said deployment services comprises services for deploying said physical machines and virtual machines.

8. The cloud computing system as recited in claim 1, wherein the computer program further comprises instructions for:
presenting said user interface to access a fault detection system for detecting faults across one or more of said storage hardware, said network hardware, said compute hardware and said memory hardware for the one or more cloud construction blocks.

9. The cloud computing system as recited in claim 1, wherein the computer program further comprises instructions for:
presenting said user interface to perform monitoring services for the one or more cloud construction blocks, wherein said monitoring services comprises services for monitoring hardware usage, bandwidth utilization, temperature and virtual machine utilization.

10. A computer program product embodied in a non-transitory computer readable storage medium for managing and deploying physical and virtual environments across multiple hardware platforms, the computer program product comprising the programming instructions for:
presenting a user interface by a management blade to manage modular pieces of hardware of one or more cloud construction blocks, wherein said modular pieces of hardware of the one or more cloud construction blocks are used to build a cloud computing environment by deploying physical and virtual machines in the one or more cloud construction blocks, wherein said modular pieces of hardware comprises compute hardware, memory hardware, storage hardware and network hardware, wherein said management blade is located within the one or more cloud construction blocks, wherein said management blade is coupled to said modular pieces of hardware within the one or more cloud construction blocks;
recognizing additional or fewer modular units of one or more of said compute hardware, said memory hardware, said storage hardware and said network hardware in the one or more cloud construction blocks from a last determination time; and
adjusting cloud capacity available to a user based on said recognizing of additional or fewer modular units of one or more of said compute hardware, said memory hardware, said storage hardware and said network hardware in the one or more cloud construction blocks, wherein said adjusting said cloud capacity available to said user comprises rebalancing cloud capacity resources to service said user, wherein said rebalancing comprises relocating one or more virtual machines from one cloud construction block to another cloud construction block, adding one or more virtual machines to a cloud construction block, relocating one or more virtual machines within a cloud construction block and any combination thereof.

11. The computer program product as recited in claim 10 further comprising programming instructions for:
monitoring for changes in components of the one or more cloud construction blocks; and
monitoring hardware failures of said modular pieces of hardware.

12. The computer program product as recited in claim 10 further comprising programming instructions for:
receiving a pattern of a computing environment and policy settings; and
translating said pattern into required components to service said pattern per said policy settings.

13. The computer program product as recited in claim 12 further comprising programming instructions for:
receiving a topology pattern in a form of virtual machines.

14. The computer program product as recited in claim 12 further comprising programming instructions for:
receiving an application pattern.

15. The computer program product as recited in claim 10 further comprising programming instructions for:
presenting said user interface to perform one or more of deployment, placement, monitoring and maintenance services for the one or more cloud construction blocks.

16. The computer program product as recited in claim 10 further comprising programming instructions for:
presenting said user interface to perform deployment services for the one or more cloud construction blocks, wherein said deployment services comprises services for deploying said physical machines and virtual machines.

17. The computer program product as recited in claim 10 further comprising programming instructions for:
presenting said user interface to access a fault detection system for detecting faults across one or more of said storage hardware, said network hardware, said compute hardware and said memory hardware for the one or more cloud construction blocks.

18. The computer program product as recited in claim 10 further comprising programming instructions for:
presenting said user interface to perform monitoring services for the one or more cloud construction blocks, wherein said monitoring services comprises services for monitoring hardware usage, bandwidth utilization, temperature and virtual machine utilization.

* * * * *